United States Patent
Draznin et al.

(10) Patent No.: US 12,164,950 B2
(45) Date of Patent: Dec. 10, 2024

(54) APPARATUS AND METHOD FOR PORT MAPPING OF VIRTUAL MACHINES IN CLOUD INFRASTRUCTURE

(71) Applicant: RAKUTEN MOBILE, INC., Tokyo (JP)

(72) Inventors: Sagiv Draznin, Tokyo (JP); Petrit Nahi, Tokyo (JP); Sharad Sriwastawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 446 days.

(21) Appl. No.: 17/457,968

(22) Filed: Dec. 7, 2021

(65) Prior Publication Data
US 2022/0283844 A1  Sep. 8, 2022

Related U.S. Application Data

(60) Provisional application No. 63/156,887, filed on Mar. 4, 2021.

(51) Int. Cl.
*G06F 9/455* (2018.01)
*H04L 43/0823* (2022.01)

(52) U.S. Cl.
CPC ...... *G06F 9/45558* (2013.01); *H04L 43/0823* (2013.01); *G06F 2009/45579* (2013.01);
(Continued)

(58) Field of Classification Search
CPC ....... G06F 9/45558; G06F 2009/45579; G06F 2009/45591; G06F 2009/45595; H04L 43/0823
See application file for complete search history.

(56) References Cited

U.S. PATENT DOCUMENTS

| | | | | |
|---|---|---|---|---|
| 2012/0311576 A1* | 12/2012 | Shu | ....... | G06F 9/4818 718/1 |
| 2016/0156539 A1* | 6/2016 | Savla | ....... | H04L 41/122 370/252 |

(Continued)

OTHER PUBLICATIONS

International Search Report dated Mar. 3, 2022 in International Application No. PCT/US2021/063034.
(Continued)

*Primary Examiner* — Wissam Rashid
(74) *Attorney, Agent, or Firm* — Sughrue Mion, PLLC

(57) ABSTRACT

A method and apparatus for mapping a virtual machine in a cloud infrastructure to a network port. The method includes: obtaining, by a smart monitoring device distinct from the virtual machine and a network appliance, a first location of the virtual machine in the cloud infrastructure; mapping, by the smart monitoring device, the first location of the virtual machine to a first source port in the network appliance and a first destination port in the network appliance; based on a determination that the virtual machine is not at the first location, obtaining, by the smart monitoring device, a second location of the virtual machine in the cloud infrastructure; and based on the determination that the virtual machine is not at the first location, mapping, by the smart monitoring device, the second location of the virtual machine to a second source port in the network appliance and a second destination port in the network appliance.

19 Claims, 7 Drawing Sheets

(52) U.S. Cl.
CPC .............. *G06F 2009/45591* (2013.01); *G06F 2009/45595* (2013.01)

(56) References Cited

U.S. PATENT DOCUMENTS

| | | | |
|---|---|---|---|
| 2018/0109602 A1* | 4/2018 | Doctor | H04L 43/12 |
| 2018/0367412 A1* | 12/2018 | Sethi | H04L 43/20 |
| 2020/0065129 A1* | 2/2020 | Yoshida | G06F 9/45558 |

OTHER PUBLICATIONS

Written Opinion of the International Searching Authority dated Mar. 3, 2022 in International Application No. PCT/US2021/063034.

* cited by examiner

| Virtual Machine | Location within Cloud Infrastructure | Port Mapping within ACI Fabric | Status |
|---|---|---|---|
| Application 1 | C1R2S2 | P1a | Healthy |
| Application 1 | C1R2S2 | P1a | Healthy |
| Application 1 | Unknown | Unknown | Failed |
| Application 1 | Unknown | Unknown | Failed |
| Application 1 | C1R3S3 | P4b | Healthy |
| Application 1 | C1R3S3 | P4b | Healthy |

21 → Virtual Machine
22 → Location within Cloud Infrastructure
23 → Port Mapping within ACI Fabric
24 → Status
20 → (table)

FIG. 3

Related Art

APPARATUS AND METHOD FOR PORT MAPPING OF VIRTUAL MACHINES IN CLOUD INFRASTRUCTURE

TECHNICAL FIELD

This disclosure relates to a smart monitoring device, and more particularly to a smart monitoring device for monitoring the location or location change of virtual machines within a cloud network.

DESCRIPTION OF RELATED ART

Cloud networks give users access to resources typically through a centralized third-party provider operating interconnected servers. Users may access these resources through a network, and are not required to own and maintain their own hardware, thereby saving substantial time, money and resources in set-up and maintenance. The cloud network maintains a cloud infrastructure that utilizes hardware (e.g., servers) and software to house a plurality of hosts containing virtual machines, which are then accessible to the user through network infrastructure, such as an Application Centric Infrastructure Fabric (hereinafter "ACI Fabric") or a router.

Cloud networks further allow an operator or user to monitor the traffic within the network for purposes of analysis, troubleshooting, etc. Monitoring traffic may include port mirroring, which allows an operator to look at traffic to and from certain switches or network appliances. For example, an operator may utilize a Switched Port Analyzer (hereinafter "SPAN"), which copies network traffic as it moves to a designated interface or port on a network appliance or switch (e.g., router or ACI Fabric) and routes the copied traffic to a destination or monitor interface (hereinafter "SPAN port") in the appliance or switch. The SPAN port, in turn, provides the mirrored traffic to a destination, such as a network analyzer, a monitoring device, or other tool used for packet analysis, traffic analysis, troubleshooting, etc.

When the operator is configuring the virtual machine, the operator must manually create a mapping between the virtual machine within the cloud infrastructure and a SPAN port in a network appliance, such as a router or ACI Fabric. This mapping allows an operator to locate individual virtual machines within the cloud infrastructure and set up the port mirroring therefor. Thus, the operator can track or troubleshoot network traffic that is specific to that virtual machine through its designated SPAN port. The mapping is a 1:1 relationship between the specific virtual machine, the ACI Fabric port (or source interface within the ACI Fabric), and the designated SPAN port (or destination interface within the ACI Fabric).

For example, as outlined in FIG. 6, the Cloud Infrastructure 101 includes a plurality of virtual machines 104, 105, 106. The Cloud Infrastructure 101 may include a plurality of hosts, such as server clusters, individual servers and computers, or a combination thereof. The virtual machines 104, 105, 106 may be applications, but are not limited thereto. These virtual machines 104, 105, 106 are loaded or created in hosts within the Cloud Infrastructure 101 and are connected, using wired connections, to the ACI Fabric 102 through source interfaces or ports 110. The ACI Fabric 102 may further include SPAN ports 111 that are connected to a monitoring system 103, which is used to monitor and analyze traffic to and from the plurality of virtual machines 104, 105, 106 within the Cloud Infrastructure 101.

However, there are instances in which a virtual machine may moves to a different host within the Cloud Infrastructure 101. This may be due to, for example, application failure, a hardware upgrade of the original host, maintenance requirements, troubleshooting requirements, security requirements, or operator preference.

When a virtual machine is moved to a new host, it loses its connection to a SPAN port 111 within the ACI Fabric 102. In this case, traffic to/from that virtual machine can no longer be monitored until an operator manually assigns a new SPAN port 111 and updates the mapping between the new location of the virtual machine, the ACI Fabric port 110, and the SPAN port 111. For example, in FIG. 6, the virtual machine 106 may move from a first host to a second host in the cloud infrastructure 101. As a result, the virtual machine 106's connection to a SPAN port 111 is lost and network traffic cannot be monitored by the monitoring system 103. To restore this connection, an operator is required to manually update the ACI Fabric 102, namely the allocation of a SPAN port 111 to the virtual machine 106 and the 1:1 logical mapping between the new location of virtual machine 106 in the second host, the port 110 in the ACI Fabric 102, and the newly-allocated SPAN port 111.

This manual re-configuration of the mapping of the virtual machine is inefficient, time-consuming, and continuously costs resources that could be allocated to other maintenance or security aspects of the cloud network.

SUMMARY

The present disclosure provides a smart monitoring device that determines and maps the location of virtual machines within a cloud infrastructure and an ACI fabric in real time without requiring an operator to manually re-configure the mapping and update the virtual machine location to a new designated SPAN port when the virtual machine moves from one host to another and loses its connection to a SPAN port.

Additional aspects will be set forth in part in the description which follows and, in part, will be apparent from the description, or may be learned by practice of the presented embodiments of the disclosure In accordance with an aspect of the present disclosure, there is provided a method of mapping a virtual machine in a cloud infrastructure to a network port, the method including: obtaining, by a smart monitoring device distinct from the virtual machine and a network appliance, a first location of the virtual machine in the cloud infrastructure; mapping, by the smart monitoring device, the first location of the virtual machine to a first source port in the network appliance and a first destination port in the network appliance; based on a determination that the virtual machine is not at the first location, obtaining, by the smart monitoring device, a second location of the virtual machine in the cloud infrastructure; and based on the determination that the virtual machine is not at the first location, mapping, by the smart monitoring device, the second location of the virtual machine to a second source port in the network appliance and a second destination port in the network appliance.

The network appliance may be an Application Centric Infrastructure (ACI) Fabric, and the first destination port and the second destination port may be Switch Port Analyzer (SPAN) ports.

The method may further include: determining, by the smart monitoring device, that the virtual machine is at the first location based on a communication received from the virtual machine; and determining, by the smart monitoring device, that the virtual machine is not at the first location based on the communication not being received from the virtual machine.

The method may further include: transmitting, by the smart monitoring device, a first communication to the virtual machine, wherein the determining that the virtual machine is at the first location may include determining, by the smart monitoring device, that the virtual machine is at the first location based on a second communication received from the virtual machine in response to the first communication, and wherein the determining that the virtual machine is not at the first location may include determining, by the smart monitoring device, that the virtual machine is not at the first location based on no communication being received from the virtual machine in response to the first communication.

The determining that the virtual machine is not at the first location based on no communication being received may include determining, by the smart monitoring device, that the virtual machine is not at the first location based on no communication being received from the virtual machine in response to the first communication within a predetermined period of time.

The smart monitoring device may include a database to store the mapping between the first location of the virtual machine, the first source port, and the first destination port, and to store the mapping between the second location of the virtual machine, the second source port, and the second destination port.

The mapping the second location of the virtual machine to the second source port and the second destination port may include: based on the determination that the virtual machine is not at the first location, automatically transmitting, by the smart monitoring device to the network appliance, a message; and receiving, from the network appliance in response to the transmitted message, information on the second destination port in the network appliance.

The message may be a request to allocate a new destination port to the virtual machine located at the second location.

The first location may include identification information of a first host in the cloud infrastructure, and the second location may include identification information of a second host in the cloud infrastructure.

In accordance with another aspect of the present disclosure, there is provided an apparatus for mapping a virtual machine in a cloud infrastructure to a network port, the apparatus including: a communication interface; a memory; and a processor configured to execute instructions to: obtain a first location of the virtual machine in the cloud infrastructure; store, in the memory, a mapping of the first location of the virtual machine to a first source port in a network appliance and a first destination port in the network appliance; based on a determination that the virtual machine is not at the first location, obtain a second location of the virtual machine in the cloud infrastructure; and based on the determination that the virtual machine is not at the first location, map the second location of the virtual machine to a second source port in the network appliance and a second destination port in the network appliance.

The network appliance may be an Application Centric Infrastructure (ACI) Fabric, and the first destination port and the second destination port may be Switch Port Analyzer (SPAN) ports.

The processor may be further configured to execute the instructions to: determine that the virtual machine is at the first location based on a communication received from the virtual machine; and determine that the virtual machine is not at the first location based on the communication not being received from the virtual machine.

The processor may be further configured to execute the instructions to: control to transmit, via the communication interface, a first communication to the virtual machine; determine that the virtual machine is at the first location based on a second communication received from the virtual machine in response to the first communication; and determine that the virtual machine is not at the first location based on no communication being received from the virtual machine in response to the first communication.

The processor may be further configured to execute the instructions to determine that the virtual machine is not at the first location based on no communication being received from the virtual machine in response to the first communication within a predetermined period of time.

The memory may store a database to store the mapping between the first location of the virtual machine, the first source port, and the first destination port, and to store the mapping between the second location of the virtual machine, the second source port, and the second destination port.

The processor may be further configured to execute the instructions to: based on the determination that the virtual machine is not at the first location, automatically transmit, to the network appliance via the communication interface, a message; and receive, from the network appliance in response to the transmitted message, information on the second destination port in the network appliance.

The message may be a request to allocate a new destination port to the virtual machine located at the second location.

In accordance with another aspect of the present disclosure, there is provided a non-transitory computer-readable recording medium having recorded thereon instructions executable by at least one processor to perform a method of mapping a virtual machine in a cloud infrastructure to a network port, the method including: obtaining, by a smart monitoring device distinct from the virtual machine and a network appliance, a first location of the virtual machine in the cloud infrastructure; mapping, by the smart monitoring device, the first location of the virtual machine to a first source port in the network appliance and a first destination port in the network appliance; based on a determination that the virtual machine is not at the first location, obtaining, by the smart monitoring device, a second location of the virtual machine in the cloud infrastructure; and based on the determination that the virtual machine is not at the first location, mapping, by the smart monitoring device, the second location of the virtual machine to a second source port in the network appliance and a second destination port in the network appliance.

The network appliance may be an Application Centric Infrastructure (ACI) Fabric, and the first destination port and the second destination port may be Switch Port Analyzer (SPAN) ports.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 3 is an example of a database created by an apparatus for mapping a virtual machine to a network port according to an embodiment;

DETAILED DESCRIPTION

Hereinafter, specific embodiments to which the present disclosure is applied will be described in detail with reference to drawings. The present disclosure is not limited to the following embodiments. In addition, the following description and drawings are simplified as appropriate for the sake of clarity.

A method for automatically mapping a network port (such as a SPAN port) in a network appliance (such as a switch or a router) to a virtual machine according to an embodiment will now be described with reference to FIGS. 1 through 4. In the present disclosure, a SPAN port is described as an example of the interface or network port that is automatically mapped to the virtual machine, although it is understood that embodiments are not limited thereto. Additionally, in the present disclosure, an ACI Fabric or a router are provided as examples of the network appliance, although it is understood that embodiments are not limited thereto and may be applied to any network switch. Further, it is understood that the methods described with reference to FIGS. 1 through 4 may be implemented by a smart monitoring device, which may also be referred to herein as a smartSPAN entity (SSE), that includes at least one processor configured to execute instructions to perform or implement the methods.

Figure 1:
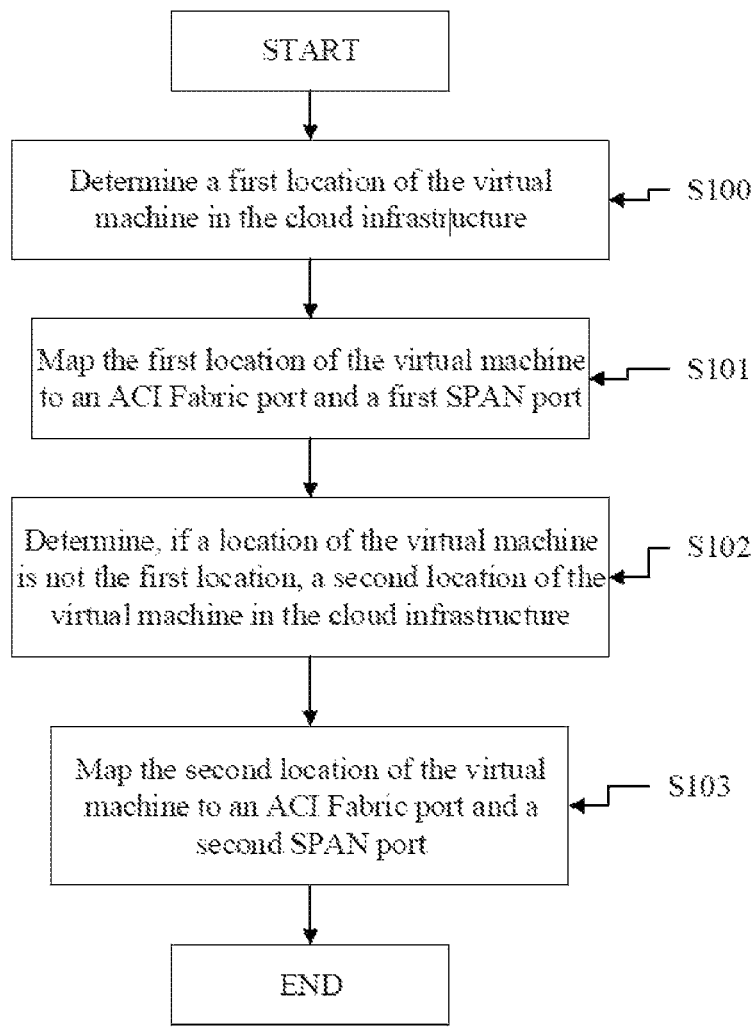
FIG. 1 is a flowchart illustrating a method for mapping a virtual machine to a network port according to an embodiment.

FIG. 1 is a flowchart illustrating a method for mapping a location of a virtual machine to a network port according to an embodiment. Referring to FIG. 1, in step S100, the smart monitoring device (e.g., a state machine), such as a smartSPAN entity according to an embodiment, determines a first location of the virtual machine within a cloud infrastructure. That is, the physical location and/or virtual location of the virtual machine is determined. The location of the virtual machine may include at least one from among an identifier of a host within the cloud infrastructure, a host address (such as a MAC address of the host), a physical host location, etc. For example, the host may be a server within the cloud infrastructure, and the cloud infrastructure may consist of a server cluster with racks 1 through 10 of servers 1 through 100. The smart monitoring device may determine that the virtual machine is located in cluster 1, rack 1, server 5, which is the specific physical location of the host in the cloud infrastructure.

The location of the virtual machine may be determined or obtained by the smart monitoring device in a variety of ways according to various embodiments. For example, the location may be provided to the smart monitoring device by an operator, a network orchestrator, a network orchestration tool, etc., when the virtual machine is initially loaded within the host, or based on an occurrence of an event (e.g., a discovery request or location query from the smart monitoring device, a periodic reporting by the orchestrator at predetermined time intervals, etc.). Alternatively, the location may be reported by a location-aware host or the virtual machine based on a pull or push communication with the smart monitoring device. The host or the virtual machine may report the location when the virtual machine is initially loaded or based on occurrence of an event (e.g., a discovery request or location query broadcast, multicast, or unicast from the smart monitoring device, a periodic reporting by the host of virtual machines loaded or executing therein at predetermined time intervals, etc.).

The host may be an application server, but is not limited thereto. For example, the host may also include catalog servers, communication servers, computing servers, database servers, file servers, game servers, media servers, web servers, and the like. The host (e.g., server 5, in cluster 1, rack 1) may be wired to a router, such as an ACI Fabric, through a port from the host to a port (e.g., source interface) within the ACI Fabric. The ACI Fabric may include a combination of software and hardware, such as a processor and memory. The memory may store various software modules or codes for operating the ACI Fabric, and the processor may control the operations of the ACI Fabric by executing various software modules that are stored in the memory, but is not limited thereto. The ACI Fabric may further include a plurality of SPAN ports. Each SPAN port (or destination interface) may create and/or direct a mirrored copy of the network traffic at a specific port or interface in the ACI Fabric to a monitoring system, allowing for a user, an operator, an administrator, etc., to monitor the activity and traffic to and from a specific virtual machine.

In step S101, the smart monitoring device maps the location of the virtual machine to a specific SPAN port that is used for monitoring the virtual machine. This mapping configuration may be initially performed by an operator through the use of software programs, such as VISIO, SOLARWINDS, PRTG, INTERMAPPER, etc., or may be automatically performed by the smart monitoring device. For example, as described above with reference to step S100, the smart monitoring device may transmit (e.g., periodically broadcast, multicast, or unicast) a location query or discovery request to the cloud infrastructure to obtain the location of the virtual machine, or the virtual machine (or an orchestrator or tool within the cloud infrastructure) may push or report its location, i.e., a unique identifier and/or address of the host in which it is executing. The smart monitoring device may similarly query the ACI Fabric as to which ACI Fabric port and SPAN port the virtual machine is mapped to. Alternatively, based on obtaining a new location for a virtual machine, the smart monitoring device may automatically transmit an instruction or a request to the ACI Fabric to allocate a SPAN port to the virtual machine. This mapping is maintained within the smart monitoring device.

Figure 4:
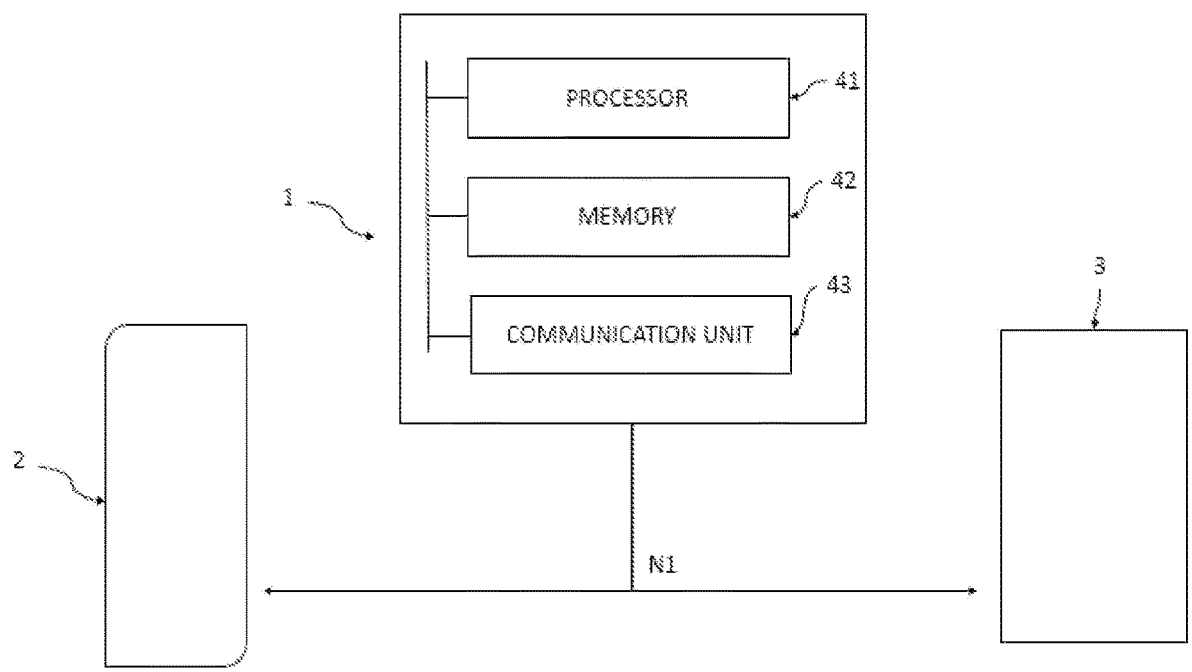
FIG. 4 is a block diagram of an apparatus for mapping a virtual machine to a network port according to an embodiment.

The smart monitoring device is in communication with both the host and the ACI Fabric. The smart monitoring device may include one or more processors and one or more computer-readable media, for storing program instructions for execution by at least one of the one or more processors via at least one of the one or more memories, as illustrated in FIG. 4.

In step S102, a determination is made as to whether or not the location of the virtual machine has changed. This determination may be made by communication between the smart monitoring device and the virtual machine.

As described above, the communication between the smart monitoring device and the virtual machine may be through either push communication, pull communication or a combination thereof. Further, the communication may be performed either wirelessly or wired across a network. For example, the smart monitoring device may transmit (e.g., periodically transmit) a message to the virtual machine at predetermined time intervals or in accordance with a preset schedule. The communication may be a polling message, a status query, a location query, etc. In this case, if the smart monitoring device receives a response (e.g., at least one of an ACK message, a predetermined message, a status, a location, etc.), the smart monitoring device determines that the location of the virtual machine has not changed and/or that the status of the virtual machine is healthy. Here, the response may be received within a first predetermined time period (e.g., within 10 seconds from transmission of the communication). Conversely, if the smart monitoring device does not receive the response or does not receive the response within a second predetermined time period (which may be the same as or different from the first predetermined time period), the smart monitoring device may determine that the virtual machine is no longer at the first location. Alternatively, the smart monitoring device may determine that the virtual machine is no longer at the first location based on a predetermined number of communications (e.g., consecutive communications) for which no response is received. For example, if no response is received in response to a communication from the smart monitoring device, the smart monitoring device may transmit one or more additional communications before determining that the virtual machine has moved. This increases the accuracy of the location determination, that is, increases the likelihood that the failure to receive the response is due to the virtual machine no longer being located at the first location, as opposed to another cause (such as a network error).

According to another embodiment, the virtual machine or a network resource for the cloud infrastructur (e.g., an orchestrator or orchestrating tool) may push a predetermined communication to confirm the location of the virtual machine, for example, at predetermined time intervals or in accordance with a preset schedule. If the smart monitoring device does not receive the communication or does not receive the communication within a predetermined time period (e.g., within a predetermined time period of its expected receipt), the smart monitoring device may determine that the virtual machine is no longer at the first location. Alternatively, the smart monitoring device may determine that the virtual machine is no longer at the first location based on a predetermined number of expected or predetermined communications (e.g., consecutive communications) not being received. Further, if a predetermined or expected communication (or a predetermined number of expected communications) is not received by the smart monitoring device, the smart monitoring device may then transmit its own communication (e.g., query) to confirm that the virtual machine is no longer at the first location.

A location of the virtual machine and port mapping between the location, an ACI Fabric port and a SPAN port of the ACI Fabric may be stored in the smart monitoring device, e.g., in a database. The mapping may also include a status of the virtual machine, such as a healthy status when the location of the virtual machine is confirmed, and a failed status when the virtual machine does not respond to the communication from the smart monitoring device as described above (e.g., does not respond to a location request or query from the smart monitoring device within a predetermined period of time) or does not transmit an expected communication as described above (e.g., does not report its location based on a periodic or predetermined reporting schedule). The database may keep track of the locations of a plurality of virtual machines within a plurality of hosts, as well as the current statuses of the virtual machines, as further illustrated in FIG. 3, described below.

The communication between the smart monitoring device and the virtual machine may be continuously performed. For example, the smart monitoring device may utilize pull communication to periodically check on the status of each individual virtual machine. For example, the smart monitoring device may utilize pull communication once every 60 seconds to receive an update from the virtual machine. This allows the smart monitoring device to continuously receive information on the location and the status of the virtual machine.

When (or based on when) the smart monitoring device fails to receive a communication from the virtual machine, the smart monitoring device may update a status of the virtual machine in the database. This status may, for example, indicate that the health of the virtual machine location is unknown or failed, and/or that the communication has failed. However, the smart monitoring device may continue to attempt communication with that virtual machine even if the virtual machine does not respond. The smart monitoring device may repeatedly attempt communication with the virtual machine or, for example, a network resource such as an orchestrator of the cloud infrastructure until the virtual machine (or network resource) eventually updates the smart monitoring device with a location of the virtual machine. This location may be the first location within the host, or may be a new location within a new host.

The virtual machine location may either be assigned manually by an operator, or may be assigned automatically, e.g., by an orchestrator or network tool, as described with reference to FIG. 5 below.

The smart monitoring device, as it continuously attempts to communicate with the virtual machine, will eventually receive a response or a communication from the virtual machine (or a network resource) after the virtual machine is moved to or recreated in a new location within a new (i.e., different) host. Alternatively, upon being recreated or loaded on a new host, the virtual machine (or a network resource) may automatically update the smart monitoring device with its new location.

In step S103, the smart monitoring device maps the new location of the virtual machine to an ACI Fabric port and a SPAN port. Specifically, when the virtual machine fails or otherwise moves to a new host, the virtual machine loses its connection to the SPAN port. Based on the determination that the location of the virtual machine has changed, i.e., a determination that the virtual machine is created or executed in a new host, the smart monitoring device communicates with the ACI Fabric to request that the ACI Fabric update or create a new mapping of ACI Fabric port to SPAN port for the virtual machine, and provide the new mapping to the smart monitoring device. In this case, the smart monitoring device may automatically request that the ACI Fabric assign a SPAN port to the virtual machine and thereby mirror traffic to and from the virtual machine to a particular destination (e.g., monitoring system). The new mapping is saved within the smart monitoring device, e.g., in the database of the smart monitoring device.

Figure 2A:
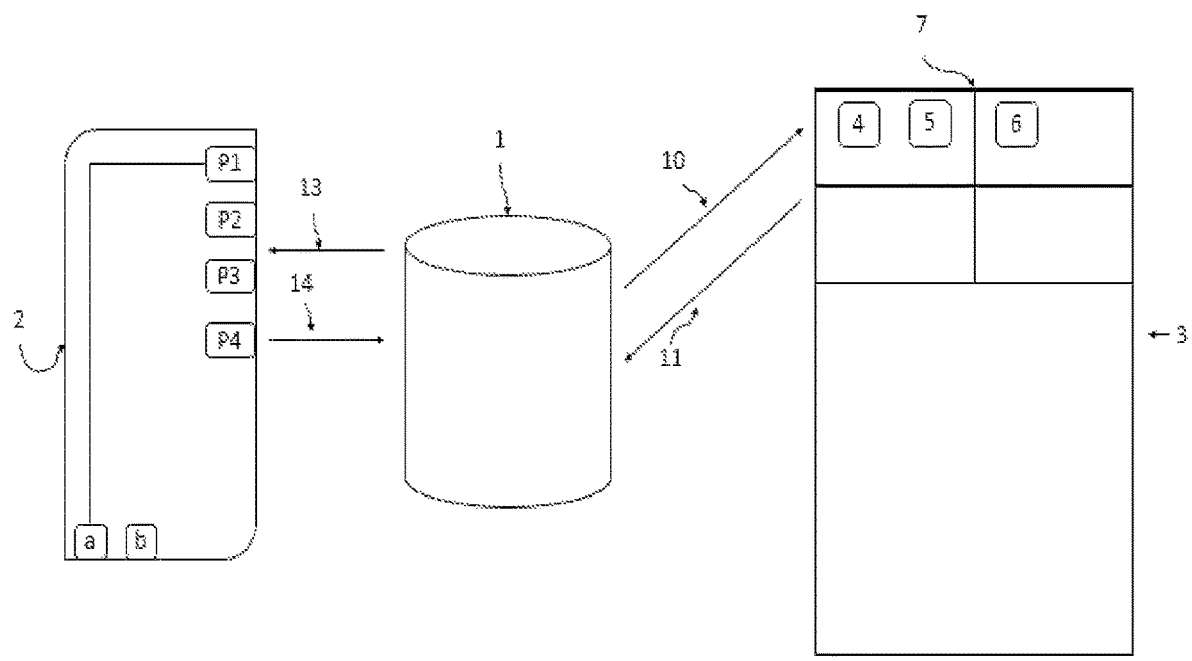
FIGS. 2A and 2B are block diagrams of a system for mapping a virtual machine to a network port according to an embodiment.
Figure 2B:
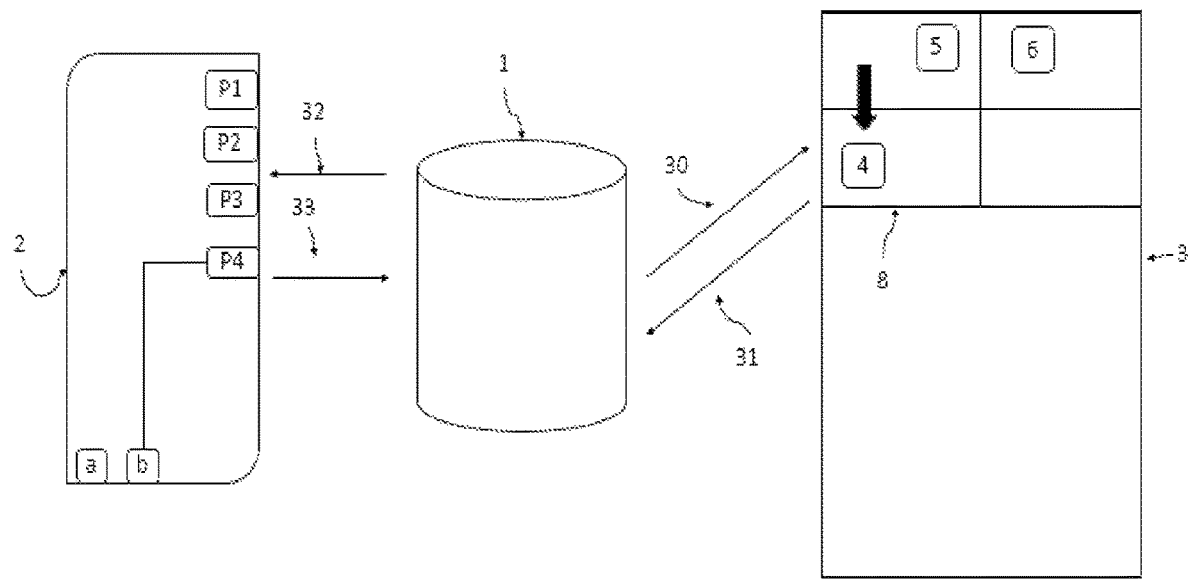

FIGS. 2A and 2B are block diagrams of a system for mapping a virtual machine to a network port according to an embodiment. Referring to FIG. 2A, the system includes a smart monitoring device 1 according to an embodiment, an ACI Fabric 2, and a cloud infrastructure 3. The smart monitoring device 1 communicates with both the ACI Fabric 2 and the cloud infrastructure 3. In particular, the smart monitoring device 1 may communicate with a plurality of virtual machines 4, 5, and 6 executing in host 7 within the cloud infrastructure 3. According to the present embodiment, the smart monitoring device 1 transmits (e.g., periodically transmits) a request 10 for location information to the virtual machines 4, 5, 6 (or to a network resource), as described above. The virtual machines 4, 5, 6 (or network resource) transmit a response 11 to the smart monitoring device 1 with their location The smart monitoring device 1 also transmits a request 13 to the ACI Fabric 2 for mapping information 13 in regard to the virtual machines 4, 5, 6. The ACI Fabric 2 provides the smart monitoring device 1 with mapping information 14 (e.g., a logical mapping) for each individual virtual machine 4, 5, 6. This mapping information indicates the ACI Fabric port and the SPAN port allocated to each individual virtual machine 4, 5, 6, as described below. While in the present embodiment, the smart monitoring device 1 requests the location information from the virtual machines 4, 5, 6, it is understood that other embodiments are not limited thereto. For example, according to another embodiment, the virtual machines 4, 5, 6 (or the cloud infrastructure 3) may push their locations to the smart monitoring device 1, as described above with reference to FIG. 1.

The information from both the cloud infrastructure 3 and the ACI Fabric 2 may be stored within a database 20 in the smart monitoring device 1, as illustrated in FIG. 3. The database 20 (e.g., state machine database) may at least list the virtual machines 21, their locations within the host 22, their port mapping within the ACI Fabric 23, and their statuses or states. For example, a virtual machine, identified as Application 1, may be located in a host at cluster 1, rack 2, server 2 (C1R2S2), have a port mapping in the ACI Fabric from ACI Fabric port 1 to SPAN port a (P1a), and have a status of "healthy." The database 20 is periodically updated with information received through push or pull communication, or a combination thereof, between the smart monitoring device 1 and the virtual machine. If the virtual machine fails to provide the smart monitoring device with its location information (or another indication that it has not moved, such as an Acknowledgment message or a state/status flag) or the smart device 1 does not receive the location information or indication (e.g., within a predetermined time period and/or in response to a predetermined number of requests), the smart monitoring device 1 will update the database 20 accordingly. For example, if Application 1 fails to provide the smart monitoring device 1 with information, the database 20 may update the location in the host as "unknown," the port mapping in the ACI Fabric as "unknown" and the status as "failed." The database 20 will continue to update and maintain these designations until the virtual machine provides the smart monitoring device 1 with information. When the virtual machine provides the smart monitoring device with new information, the smart monitoring device queries or commands the ACI Fabric for a new port mapping or SPAN port allocation and updates the database 20 accordingly. For example, when the virtual machine is moved to or recreated in a new host, the database 20 may update the host location to cluster 1, rack 3, server 3 (C1R3S3), the port mapping in the ACI Fabric as being from ACI Fabirc port 4 to SPAN port b (P4b), and the status as "healthy."

Referring to FIG. 2B, when a virtual machine 4 moves to a new location in a different host 8 within the cloud infrastructure 3, the smart monitoring device 1 communicates with the virtual machine 4 or a network resource (e.g., push or pull communication) and queries or requests location information 30 from the virtual machine 4. The virtual machine 4 provides the location information 31 to the smart monitoring device 1, which is then used to update the database 20, as illustrated in FIG. 3. For example, in FIG. 3, as described above, the new location may be updated as C1R3S3. Additionally, the smart monitoring device 1 transmits a request or a command 32 for a new port mapping (e.g., allocation of a SPAN port) for the virtual machine 4 to the ACI Fabric 2. Based on this request 32, the ACI Fabric 2 allocates a SPAN port to the virtual machine 4 and provides the smart monitoring device 1 with the new port mapping 33. The smart monitoring device 1 updates the database 20 based on this port mapping 33. That is, the smart monitoring device 1 updates the mapping of the virtual machine 4 to the ACI Fabric port and to the newly allocated SPAN port based on the information 33 received from the ACI Fabric 2. This updated mapping is stored in the database 20 in the smart monitoring device 1, and can be used by the smart monitoring device 1 to monitor the status of the virtual machine and determine whether to automatically request allocation of a new SPAN port. This entire process may be performed without human intervention, and with minimal interruption of service (e.g., minimal interruption to the traffic or packet analysis by the SPAN destination such as a monitoring system).

FIG. 4 is a block diagram of an apparatus 1 for mapping a virtual machine to a network port according to an embodiment. It should be appreciated that FIG. 4 provides an illustration of one implementation and does not imply any limitations with regard to the environments in which different embodiments may be implemented. Many modifications to the depicted environments may be made based on design and implementation requirements.

The apparatus, i.e., a smart monitoring device 1, according to the present embodiment may be implemented by a personal computer, a laptop computer, a mobile device, a workstation, a client terminal, a server, etc. Referring to FIG. 4, the smart monitoring device 1 includes a memory 42 storing instructions and/or software code, a processor 41 (e.g., at least one processor) configured to execute those instructions and/or code to implement one or more of the methods described above with reference to FIGS. 1 through 4, and a communication unit 43 or interface (e.g., network interface or communication circuitry).

The processor 41 may be implemented as at least one of an application specific integrated circuit (ASIC), an embedded processor, a microprocessor, hardware control logic, a hardware finite state machine (FSM), a digital signal processor (DSP), or the like. The processor 41 may include a central processing unit (CPU), a graphic processing unit (GPU), a main processing unit (MPU), or the like. In addition, the processor 41 may include one or more processors.

The memory 42 may include a semiconductor memory, such as a flash memory, a magnetic storage medium such as a hard disk, or the like. The memory 42 may refer to any volatile or non-volatile memory, a read-only memory (ROM), a random access memory (RAM) communicatively coupled to the processor 41 or a memory card (e.g., a micro SD card, a memory stick) connectable to the smart monitoring device 1. The memory 42 may store various software modules or codes for operating the smart monitoring device 1, and the processor 41 may control the operations of the smart monitoring device 1 by executing various software modules that are stored in the memory 42. That is, the memory 42 may be accessed by the processor 41 to perform data reading, recording, modifying, deleting, updating or the like. Further, the memory 42 may store executable instructions, code, data objects etc.

Further, the smart monitoring device 1 communicates with the ACI Fabric 2 and the cloud infrastructure 3 via the communication unit 43. Examples of the communication unit 43 include a local area network (LAN) interface board, a wireless communication circuit for wireless communication, or a combination thereof. The LAN interface board or the wireless communication circuit is connected to the network N1 via wired and/or wireless communication, such as Ethernet, WiFi®, etc. Further, the network N1 may include an intranet or the Internet.

The processor 41 is configured to execute instructions stored in the memory 42 to perform one or more of the methods described above with reference to FIGS. 1 through 4. For example, the processor 41 controls to determine the location of a virtual machine in the cloud infrastructure 3, such as via a push or a pull communication with the cloud infrastructure as described above. Additionally, the processor 41 controls to communicate with the ACI Fabric 2 to obtain a port mapping to a SPAN port for the virtual machine, and stores this information in a database. The processor 41 may additionally control to update the database continuously or periodically, such as via polling messages, location queries, status queries, prescheduled notifications, etc. If the processor 41 determines that the virtual machine is no longer located at a first location such that connection to the SPAN port fails, the processor 41 attempts to obtain a new location of the virtual machine (e.g., via push or pull communication). Based on obtaining the new location of the virtual machine, the processor 41 controls to communicate with the ACI Fabric 2 to request or command a new SPAN port allocation for the virtual machine. The processor 41 receives a new mapping between the ACI Fabric port and the SPAN port and stores the same in connection with the virtual machine and its location.

In a related art system, a user must continuously monitor the cloud infrastructure to identify when a virtual machine fails and is recreated in a new host. When the virtual machine moves to a new host, its prior connection to a SPAN port is lost and, for example, network traffic to/from the virtual machine cannot be monitored. To resolve this, a user must manually determine the location of the virtual machine in the cloud infrastructure, and manually log into the ACI Fabric to assign a new SPAN port for the virtual machine, resulting in significant operation overhead. According to embodiments of the present disclosure, however, a smart monitoring device 1 communicates with both the ACI Fabric and the cloud infrastructure and automatically obtains the location of the virtual machine and automatically maps the location to a SPAN port in the ACI Fabric, without human intervention, thereby reducing operation overhead, service interruption, and time costs.

Figure 5:
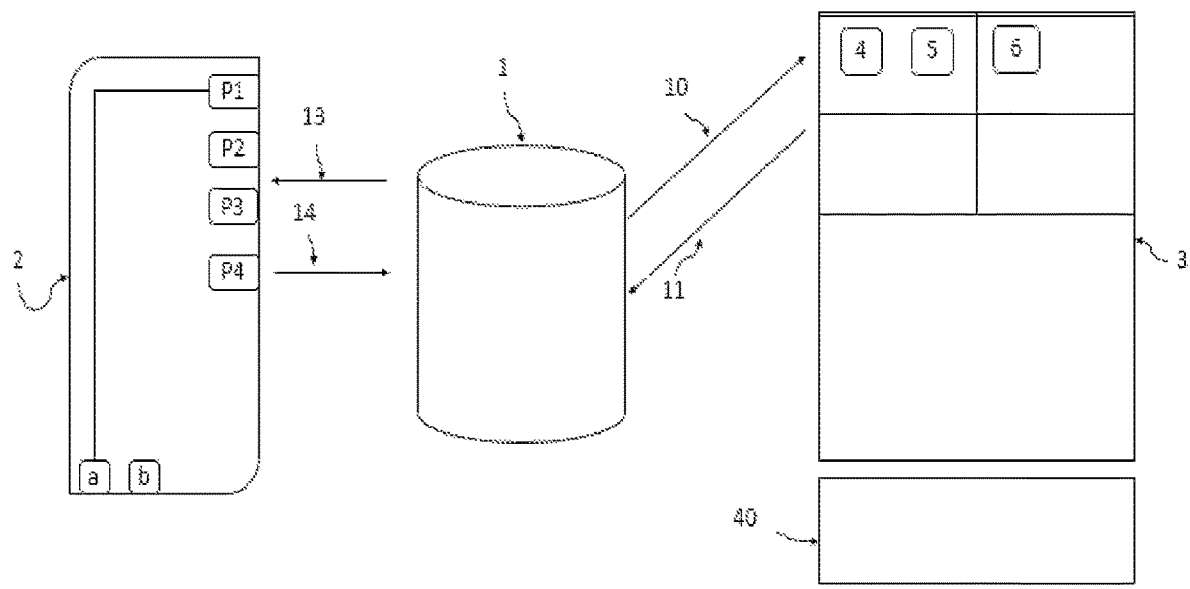
FIG. 5 is a block diagram of a system for mapping a virtual machine to a network port according to another embodiment.
Figure 6:
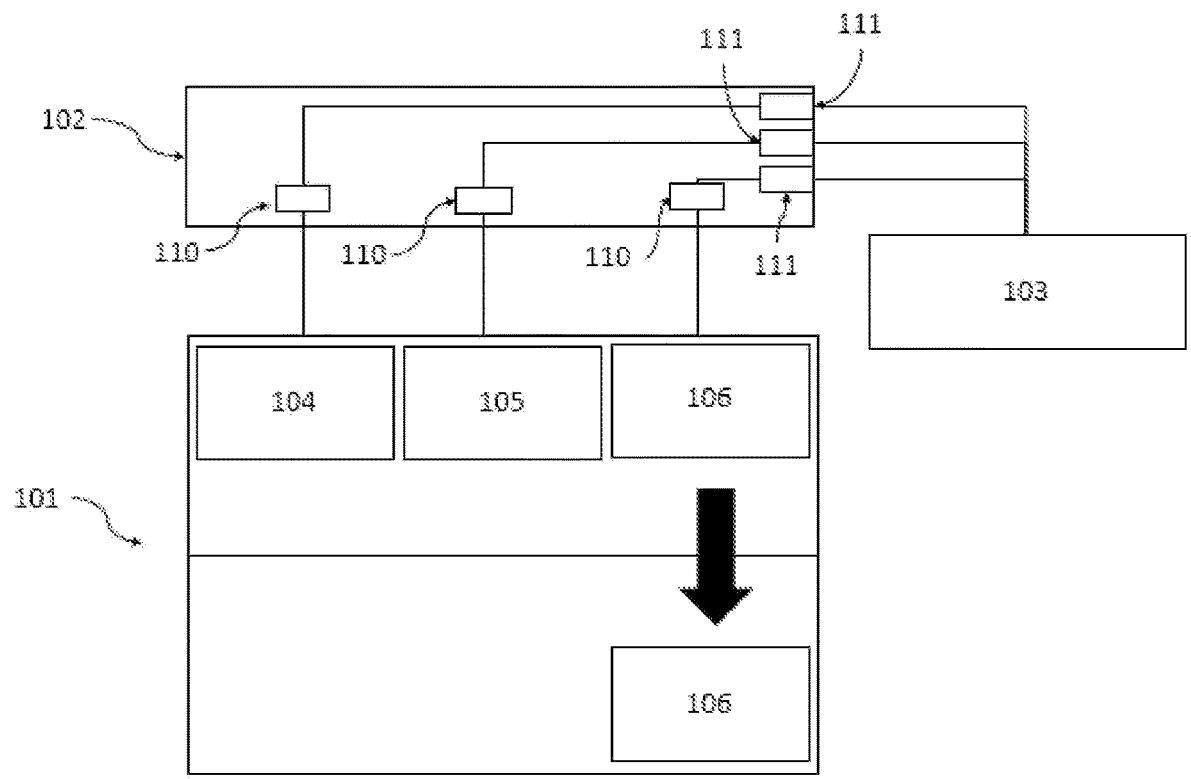
FIG. 6 is a block diagram of a system for mapping a virtual machine to a network port according to a related art method.

FIG. 5 is a block diagram of a system for mapping a virtual machine to a network port according to an embodiment. Referring to FIG. 5, locations of the virtual machines 4, 5, 6 may be controlled and monitored through the use of a network resource, such as an orchestrator 40. The orchestrator 40 is a network tool implemented as software executing on a processor to manage the locations of the virtual machines 4, 5, 6 within the cloud infrastructure 3. The orchestrator 40 may be programed or configured (e.g., by an administrator operator, or manufacturer) to move the virtual machines if certain pre-set conditions are met. For example, the orchestrator 40 may be programmed to evenly distribute virtual machines amongst hosts, and may move a virtual machine from a first host to a second host to maintain this distribution or load balance.

When a virtual machine is required to change locations within the cloud infrastructure 3, the orchestrator 40 may change or control to assign a new location for the virtual machine 4. The orchestrator 40 may then communicate directly with the smart monitoring device 1 to update the smart monitoring device 1 of the location of the virtual machine 4, 5, 6 within the cloud infrastructure 3. Accordingly, the smart monitoring device 1 may perform communication with the ACI Fabric 2 and update the mapping of the virtual machines 4, 5, 6, in a similar manner as described above with reference to FIGS. 1 through 4.

According to an embodiment, methods and an apparatuses disclosed herein may be implemented as software of a computer program product. A computer program product may be distributed in the form of a machine readable storage medium (e.g., compact disc read only memory (CD-ROM)) or distributed online through an application store or between two devices directly. In the case of on-line distribution, at least a portion of the computer program product (e.g., a downloadable app) may be stored temporarily or at least temporarily in a storage medium such as a manufacturer's server, a server in an application store, or a memory in a relay server.

Embodiments of the disclosure have been shown and described above, however, the embodiments of the disclosure are not limited to the aforementioned specific embodiments. It may be understood that various modifications, substitutions, and improvements can be made by those having ordinary skill in the art in the technical field to which the disclosure belongs, without departing from the spirit of the disclosure as claimed by the appended claims. It should be understood that such modifications, substitutions, and improvements shall fall within the protection scope of the disclosure, and should not to be construed independently from the technical idea or prospect of the disclosure.

What is claimed is:

1. A method of mapping a virtual machine in a cloud infrastructure to a network port, the method comprising:
   obtaining, by a smart monitoring device distinct from the virtual machine and a network appliance, a first location of the virtual machine in the cloud infrastructure;
   mapping, by the smart monitoring device, the first location of the virtual machine to a first source port in the network appliance and a first destination port in the network appliance;
   based on a determination that the virtual machine is not at the first location, obtaining, by the smart monitoring device, a second location of the virtual machine in the cloud infrastructure; and
   based on the determination that the virtual machine is not at the first location, mapping, by the smart monitoring device, the second location of the virtual machine to a second source port in the network appliance and a second destination port in the network appliance.

2. The method of claim 1, wherein the network appliance is an Application Centric Infrastructure (ACI) Fabric, and the first destination port and the second destination port are Switch Port Analyzer (SPAN) ports.

3. The method of claim 1, further comprising:
   determining, by the smart monitoring device, that the virtual machine is at the first location based on a communication received from the virtual machine; and
   determining, by the smart monitoring device, that the virtual machine is not at the first location based on the communication not being received from the virtual machine.

4. The method of claim 3, further comprising:
   transmitting, by the smart monitoring device, a first communication to the virtual machine,
   wherein the determining that the virtual machine is at the first location comprises determining, by the smart monitoring device, that the virtual machine is at the first location based on a second communication received from the virtual machine in response to the first communication, and
   wherein the determining that the virtual machine is not at the first location comprises determining, by the smart monitoring device, that the virtual machine is not at the first location based on no communication being received from the virtual machine in response to the first communication.

5. The method of claim 4, wherein the determining that the virtual machine is not at the first location based on no communication being received comprises determining, by the smart monitoring device, that the virtual machine is not at the first location based on no communication being received from the virtual machine in response to the first communication within a predetermined period of time.

6. The method according to claim 1, wherein the smart monitoring device includes a database to store the mapping between the first location of the virtual machine, the first source port, and the first destination port, and to store the mapping between the second location of the virtual machine, the second source port, and the second destination port.

7. The method according to claim 1, wherein the mapping the second location of the virtual machine to the second source port and the second destination port comprises:
   based on the determination that the virtual machine is not at the first location, automatically transmitting, by the smart monitoring device to the network appliance, a message; and
   receiving, from the network appliance in response to the transmitted message, information on the second destination port in the network appliance.

8. The method according to claim 7, wherein the message is a request to allocate a new destination port to the virtual machine located at the second location.

9. The method of claim 1, wherein the first location comprises identification information of a first host in the cloud infrastructure, and the second location comprises identification information of a second host in the cloud infrastructure.

10. An apparatus for mapping a virtual machine in a cloud infrastructure to a network port, the apparatus comprising:
   a communication interface;
   a memory; and
   a processor configured to execute instructions to:
      obtain a first location of the virtual machine in the cloud infrastructure;
      store, in the memory, a mapping of the first location of the virtual machine to a first source port in a network appliance and a first destination port in the network appliance;
      based on a determination that the virtual machine is not at the first location, obtain a second location of the virtual machine in the cloud infrastructure; and
      based on the determination that the virtual machine is not at the first location, map the second location of the virtual machine to a second source port in the network appliance and a second destination port in the network appliance.

11. The apparatus of claim 10, wherein the network appliance is an Application Centric Infrastructure (ACI) Fabric, and the first destination port and the second destination port are Switch Port Analyzer (SPAN) ports.

12. The apparatus of claim 10, wherein the processor is further configured to execute the instructions to:
   determine that the virtual machine is at the first location based on a communication received from the virtual machine; and
   determine that the virtual machine is not at the first location based on the communication not being received from the virtual machine.

13. The apparatus of claim 12, wherein the processor is further configured to execute the instructions:
   control to transmit, via the communication interface, a first communication to the virtual machine;
   determine that the virtual machine is at the first location based on a second communication received from the virtual machine in response to the first communication; and
   determine that the virtual machine is not at the first location based on no communication being received from the virtual machine in response to the first communication.

14. The apparatus of claim 13, wherein the processor is further configured to execute the instructions to determine that the virtual machine is not at the first location based on no communication being received from the virtual machine in response to the first communication within a predetermined period of time.

15. The apparatus of claim 10, wherein the memory stores a database to store the mapping between the first location of the virtual machine, the first source port, and the first destination port, and to store the mapping between the second location of the virtual machine, the second source port, and the second destination port.

16. The apparatus of claim 10, wherein the processor is further configured to execute the instructions:
   based on the determination that the virtual machine is not at the first location, automatically transmit, to the network appliance via the communication interface, a message; and
   receive, from the network appliance in response to the transmitted message, information on the second destination port in the network appliance.

17. The apparatus of claim 16, wherein the message is a request to allocate a new destination port to the virtual machine located at the second location.

18. A non-transitory computer-readable recording medium having recorded thereon instructions executable by at least one processor to perform a method of mapping a virtual machine in a cloud infrastructure to a network port, the method comprising:
   obtaining, by a smart monitoring device distinct from the virtual machine and a network appliance, a first location of the virtual machine in the cloud infrastructure;

mapping, by the smart monitoring device, the first location of the virtual machine to a first source port in the network appliance and a first destination port in the network appliance;

based on a determination that the virtual machine is not at the first location, obtaining, by the smart monitoring device, a second location of the virtual machine in the cloud infrastructure; and based on the determination that the virtual machine is not at the first location, mapping, by the smart monitoring device, the second location of the virtual machine to a second source port in the network appliance and a second destination port in the network appliance.

19. The non-transitory computer-readable recording medium of claim 18, wherein the network appliance is an Application Centric Infrastructure (ACI) Fabric, and the first destination port and the second destination port are Switch Port Analyzer (SPAN) ports.

* * * * *